(12) United States Patent
Nakagawa et al.

(10) Patent No.: US 11,130,050 B2
(45) Date of Patent: Sep. 28, 2021

(54) INFORMATION PROCESSING SYSTEM, CONTROLLER DEVICE, AND INFORMATION PROCESSING APPARATUS

(71) Applicant: Sony Interactive Entertainment Inc., Tokyo (JP)

(72) Inventors: Yusuke Nakagawa, Kanagawa (JP); Yoichi Nishimaki, Kanagawa (JP); Yasushi Okumura, Tokyo (JP); Shinichi Hirata, Kanagawa (JP); Takuya Kuji, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/753,822

(22) PCT Filed: Oct. 16, 2017

(86) PCT No.: PCT/JP2017/037375
§ 371 (c)(1),
(2) Date: Apr. 6, 2020

(87) PCT Pub. No.: WO2019/077652
PCT Pub. Date: Apr. 25, 2019

(65) Prior Publication Data
US 2020/0246692 A1   Aug. 6, 2020

(51) Int. Cl.
*A63F 13/218* (2014.01)
*A63F 13/24* (2014.01)
(Continued)

(52) U.S. Cl.
CPC ............ *A63F 13/24* (2014.09); *A63F 13/218* (2014.09); *A63F 13/23* (2014.09); *G06F 3/011* (2013.01);
(Continued)

(58) Field of Classification Search
CPC ......... A63F 13/24; A63F 13/212; G06F 3/014
See application file for complete search history.

(56) References Cited

U.S. PATENT DOCUMENTS 6,704,694 B1   3/2004   Basdogan
6,861,945 B2   3/2005   Kim
(Continued)

FOREIGN PATENT DOCUMENTS

EP   2323022 A2   5/2011
EP   2613223 A1   7/2013
(Continued)

OTHER PUBLICATIONS

International Preliminary Report on Patentability and Written Opinion for corresponding PCT Application No. PCT/JP2017/037375, 11 pages, dated Apr. 30, 2020.
(Continued)

*Primary Examiner* — Jay Trent Liddle
(74) *Attorney, Agent, or Firm* — Matthew B. Dernier, Esq.

(57) ABSTRACT

A controller device which is connected to an information processing apparatus and is to be worn on a user's hand. The controller device includes a device body to be gripped by the user, in which a sensor outputting a sensor output based on a change in a shape of a base part of the finger is disposed on the device body in a position so as to come into contact with the bases of at least some fingers of the user when the user grips the device body. The controller device receives information output from the sensor and related to the change in the shape of the base parts of the fingers of the user, and sends out the information to the connected information processing apparatus.

5 Claims, 8 Drawing Sheets

(51) Int. Cl.
*A63F 13/23* (2014.01)
*G06F 3/01* (2006.01)

(52) U.S. Cl.
CPC .......... *A63F 2300/1025* (2013.01); *A63F 2300/1043* (2013.01); *A63F 2300/1056* (2013.01)

(56) References Cited

U.S. PATENT DOCUMENTS

| | | | |
|---|---|---|---|
| 8,323,106 | B2 | 12/2012 | Zalewski |
| 9,245,177 | B2 | 1/2016 | Perez |
| 9,477,310 | B2 * | 10/2016 | Fadili .............. G06F 3/0421 |
| 10,274,992 | B2 | 4/2019 | Ito |
| 10,391,400 | B1 * | 8/2019 | Mucha .............. A63F 13/98 |
| 10,635,171 | B2 | 4/2020 | Nakamura |
| 2002/0084982 | A1 | 7/2002 | Rosenberg |
| 2003/0234823 | A1 | 12/2003 | Sato |
| 2004/0032346 | A1 | 2/2004 | Kim |
| 2005/0179644 | A1 * | 8/2005 | Alsio .............. G06F 3/03543 345/156 |
| 2005/0219355 | A1 * | 10/2005 | Tahara .............. G06F 3/033 348/14.05 |
| 2007/0075966 | A1 * | 4/2007 | Daniel .............. G06F 3/016 345/156 |
| 2007/0085157 | A1 | 4/2007 | Fadell |
| 2008/0261693 | A1 | 10/2008 | Zalewski |
| 2011/0269544 | A1 * | 11/2011 | Daniel .............. G06F 3/014 463/37 |
| 2011/0298827 | A1 | 12/2011 | Perez |
| 2012/0249417 | A1 | 10/2012 | Cho |
| 2012/0308140 | A1 | 12/2012 | Ambrus |
| 2013/0207890 | A1 * | 8/2013 | Young .............. G10H 1/053 345/156 |
| 2014/0324611 | A1 | 10/2014 | Burkhart |
| 2015/0042580 | A1 | 2/2015 | Shim |
| 2015/0258431 | A1 | 9/2015 | Stafford |
| 2015/0290494 | A1 * | 10/2015 | King .............. A63B 23/03508 482/8 |
| 2016/0006854 | A1 | 1/2016 | Aizawa |
| 2016/0054797 | A1 | 2/2016 | Tokubo |
| 2016/0132124 | A1 | 5/2016 | Nakamura |
| 2017/0235364 | A1 | 8/2017 | Nakamura |
| 2017/0308118 | A1 | 10/2017 | Ito |
| 2017/0308165 | A1 * | 10/2017 | Erivantcev .......... G06F 3/0346 |
| 2017/0344113 | A1 * | 11/2017 | Grierson ............ G06F 3/03547 |
| 2018/0067545 | A1 * | 3/2018 | Provancher ........... A63F 13/218 |
| 2018/0161670 | A1 * | 6/2018 | Boev .............. A63F 13/24 |
| 2020/0209966 | A1 * | 7/2020 | Nakamura ............ G06F 3/014 |

FOREIGN PATENT DOCUMENTS

| | | |
|---|---|---|
| EP | 2796965 A2 | 10/2014 |
| JP | 11195140 A | 7/1999 |
| JP | 2004078966 A | 3/2004 |
| JP | 2009042796 A | 2/2009 |
| JP | 2011524048 A | 8/2011 |
| JP | 2011238068 A | 11/2011 |
| JP | 2012175282 A | 9/2012 |
| JP | 2013533537 A | 8/2013 |
| JP | 2013242652 A | 12/2013 |
| JP | 2015228115 A | 12/2015 |
| JP | 2017075465 A | 4/2017 |
| WO | 2012170349 A2 | 12/2012 |
| WO | 2015015843 A1 | 2/2015 |
| WO | 2016038953 A1 | 3/2016 |
| WO | 2016076376 A1 | 5/2016 |
| WO | 2018175419 A1 | 9/2018 |

OTHER PUBLICATIONS

International Search Report for corresponding PCT Application No. PCT/JP2017/004764, 4 pages, dated Apr. 18, 2017.
"[TGS 2015] Yoso Ijo no "Sude Kankaku" ni Odoroki. VR Kukan ni Access suru Shin Device 'Oculus Touch' Taiken Report", [online], 7 pages, [retrieval date Apr. 11, 2017 (Apr. 11, 2017)], Internet, <URL:http://www.4gamer.net/games/195/G019528/20150919032/> (Sep. 19, 2015) (for relevancy see International Search Report for corresponding PCT Application No. PCT/JP2017/004764, 4 pages, dated Apr. 18, 2017 cited above).
International Preliminary Report on Patentability and Written Opinion for corresponding PCT Application No. PCT/JP2017/004764, 11 pages, dated Sep. 13, 2018.
Supplementary Search Report for corresponding EP Application No. 17759600.4, 16 pages, dated Sep. 10, 2019.
International Search Report for corresponding Application PCT/JP2017/016770, 4 pages, dated Jul. 18, 2017.
Extended European Search Report for corresponding EP Application No. 17759600.4, 16 pages, dated Oct. 18, 2019.
Amato N M et al., "A Generalized Framework for Interactive Dynamic Stimulation for MultiRigid Bodies" IEEE Transactions on Systems, Man and Cybernetics, Part B: Cybernetics. vol. 34, No. 2, pp. 912-924 (Apr. 1, 2004).
International Preliminary Report on Patentability and Written Opinion for corresponding PCT Application No. PCT/JP2017/016770, 16 pages, dated Nov. 7, 2019.
International Search Report for corresponding Application PCTJP2017037375, 4 pages, dated Dec. 19, 2017.
International Preliminary Report on Patentability and Written Opinion for related PCT Application No. PCT/JP2017/037732, 13 pages, dated May 9, 2019.
Extended European Search Report, corresponding EP Application 17906974.5, 7 pages, dated Nov. 10, 2020.
Decision to Grant a Patent for corresponding JP Application 2019-548799, 5 pages, dated Jan. 4, 2021.

* cited by examiner

FIG. 9 i# INFORMATION PROCESSING SYSTEM, CONTROLLER DEVICE, AND INFORMATION PROCESSING APPARATUS

TECHNICAL FIELD

The present invention relates to an information processing system, a controller device, and an information processing apparatus.

BACKGROUND ART

A controller device in a home video game machine or the like detects an action performed by the user such as a button press or a device swing, and sends out information representing the detected user's action to a main body of the game machine or the like. Among such controller devices, in the past, there have been known devices each detecting a user's finger movement by capturing images of user's fingertips with a camera.

SUMMARY

Technical Problem

However, hand sizes and finger lengths differ greatly between individuals, and if sensors that detect fingertips according to the range of movement of average person's fingers are arranged, the movable range of the user's fingers cannot be covered depending on the size of the user's hand in some cases, and there are cases in which the fingertips cannot be detected stably.

The present invention has been made in view of the above circumstances, and an object thereof is to provide an information processing system, a controller device, and an information processing apparatus that can stably detect the movement of user's fingertips.

Solution to Problem

The present invention to solve the problem of the above-described conventional example is accomplished by including a controller device, which is to be worn on a hand of a user, and which has a device body to be gripped by the user, and further in which a sensor is positioned on the device body so as to come in contact with bases of at least some of fingers of the user when the user grips the device body and outputs a sensor output based on a shape change of a base part of the finger, and is accomplished by further including control means for receiving the sensor output according to the shape change of the base part of the finger of the user output by the sensor and sending out the sensor output to the information processing apparatus connected to the control means.

Advantageous Effect of Invention

Thus, the movement of the user's fingertips can be stably detected.

DESCRIPTION OF EMBODIMENT

An embodiment of the present invention will be described with reference to the drawings. Note that in the following description, sizes, ratios, and arrangements of the respective parts are examples, and the examples of the present embodiment are not limited to the illustrated sizes, ratios, and arrangements.

Figure 1:
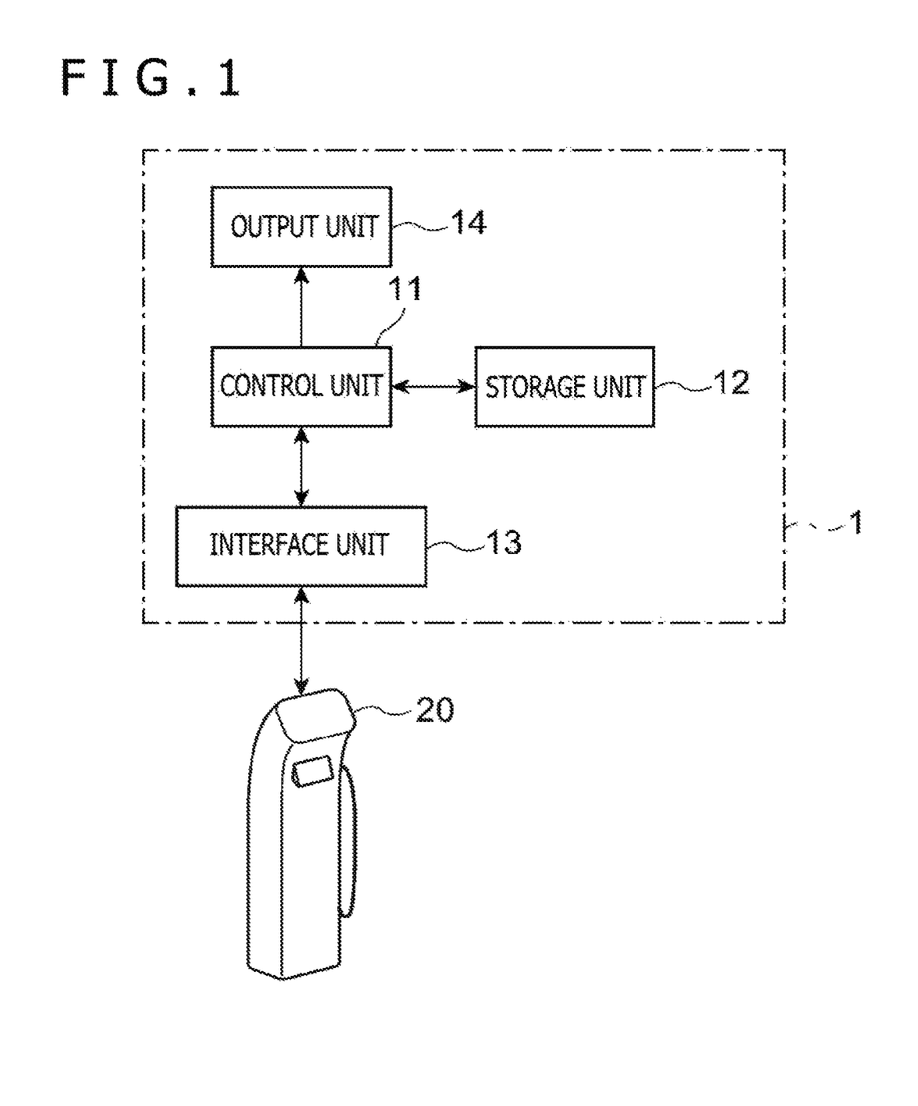
FIG. 1 is a block diagram illustrating a configuration example of an information processing system according to an embodiment of the present invention.

An information processing system according to an embodiment of the present invention is a system including a computer device such as a home video game machine, and includes an information processing apparatus 1 such as home video game machine and a controller device 20 connected to the information processing apparatus 1 as illustrated in FIG. 1.

The controller device 20 is worn and fixed to at least one of the left hand or the right hand of the user. In the following description, the controller device 20 fixed to the user's left hand and the controller device 20 fixed to the right hand may have the same shape.

Figure 2:
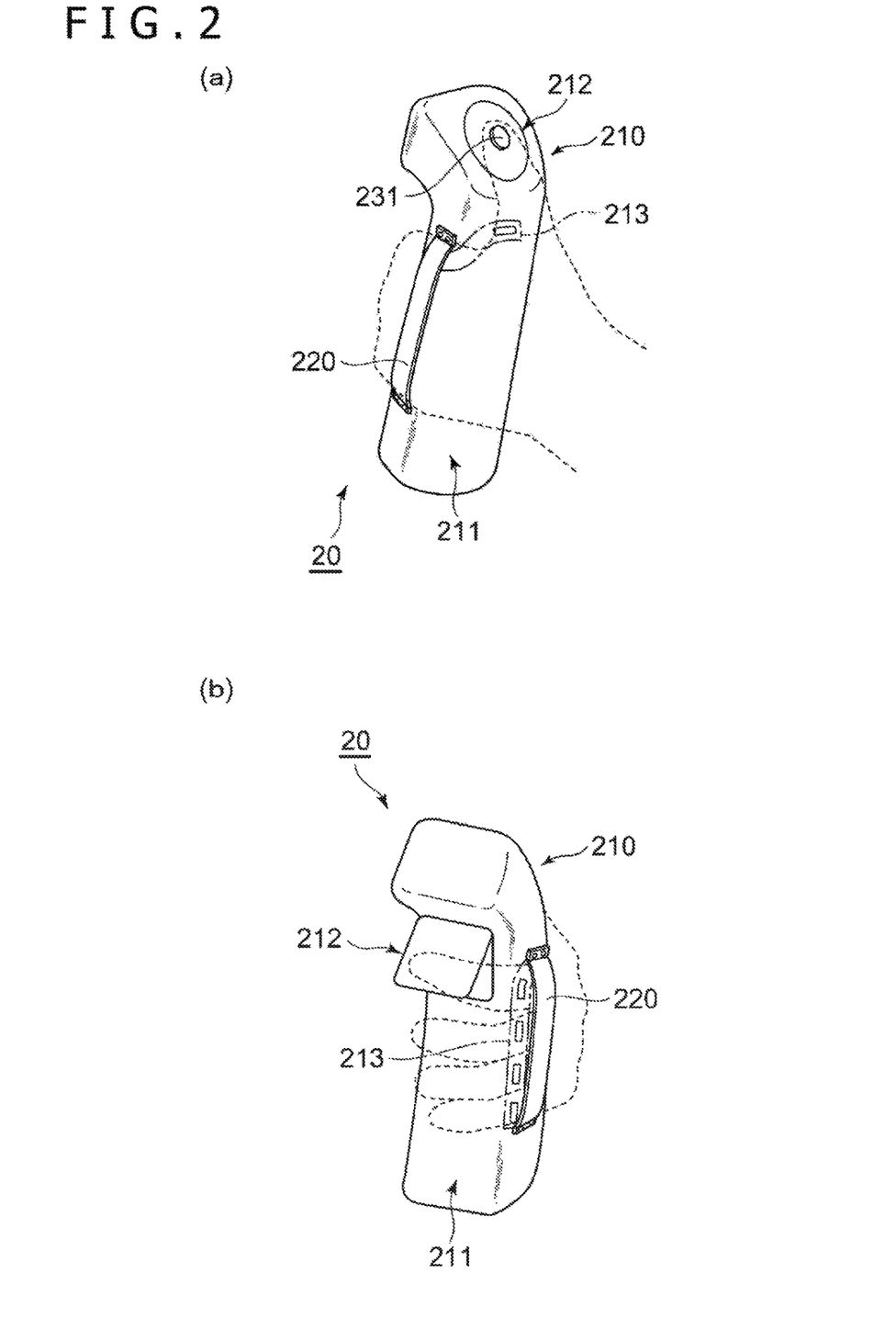
FIG. 2 depicts perspective views illustrating an outline of a controller device according to the embodiment of the present invention.
Figure 3:
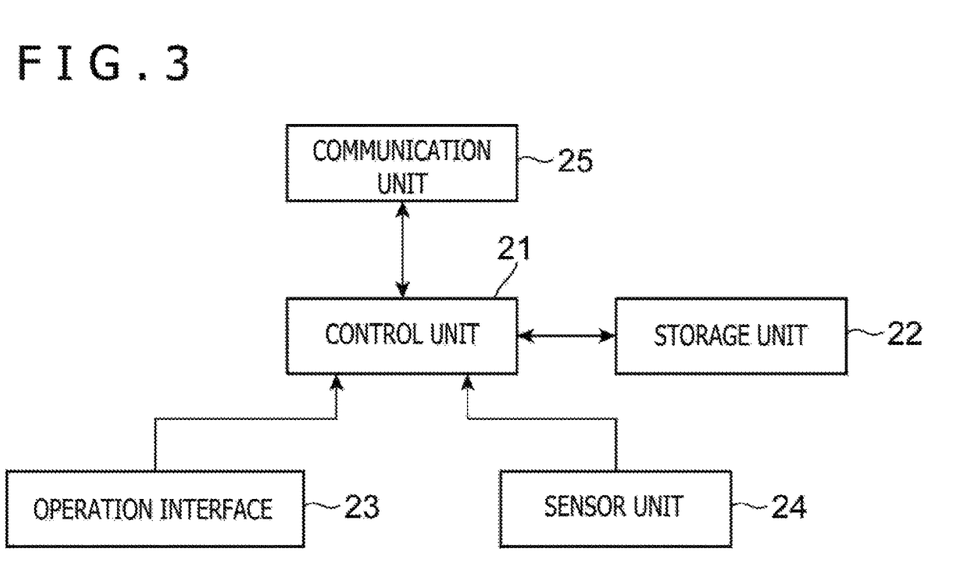
FIG. 3 is a functional block diagram illustrating an outline of the controller device according to the embodiment of the present invention.

The controller device 20 includes a device body 210 and a fixing part 220 fixed to the device body 210 as the outline is illustrated in FIG. 2. FIG. 2(*a*) is a schematic perspective view of the controller device 20 viewed from the back side, and FIG. 2(*b*) is a schematic perspective view of the controller device 20 viewed from the front side. In addition, the controller device 20 is configured so that a circuit unit including a control unit 21, a storage unit 22, an operation interface 23, a sensor unit 24, and a communication unit 25 is contained in the device body 210 as illustrated in FIG. 3.

In the example of the present embodiment, the fixing part 220 is a loop-shaped flexible belt, and the user's index finger, middle finger, third finger, and little finger are passed through the fixing part 220, and the device body 210 is used by being fixed at a position where the device body 210 is in contact with the base of the user's thumb (the position corresponding to a middle phalanx (MP) joint of the index finger, middle finger, third finger, and little finger).

The device body 210 includes a grip portion 211 to be gripped by a user, an operation portion 212, and a finger motion sensor 213. In one example of the present embodiment, the grip portion 211 has a substantially polygonal column shape. The operation portion 212 is formed continuously from the grip portion 211, and includes a button operation portion 231 and the like in the example of FIG. 2. The finger motion sensor 213 is one of the sensors included in the sensor unit 24, and is positioned on the device body 210 so that the finger motion sensors 213 come in contact with the bases of at least some fingers respectively when the user grips the device body 210 as illustrated in FIG. 2. That is, for example, the finger motion sensor 213 is positioned so as to be in contact with the base of the thumb on the back side of the controller device 20 (FIG. 2(a)), and positioned so that the base of each index finger, middle finger, third finger, and little finger is in contact with the finger motion sensors 213 on the front side (FIG. 2(b)). The finger motion sensor 213 outputs a sensor output based on the shape change of the base part of the user's finger. Detailed operation of the finger motion sensor 213 will be described later.

The size of the controller device 20 is such that when the user naturally grips the device body 210, one end thereof is located slightly outside the position where the tip of the user's thumb (what is called thumb) reaches, and the other end slightly protrudes from the base of the little finger (position corresponding to the MP joint). Even if the user opens the user's hand on the controller device 20 worn, the controller device 20 does not fall because of being fixed to the hand by the fixing part 220.

The control unit 21 according to the present embodiment is a program control device such as a central processing unit (CPU), and operates according to a program stored in the storage unit 22. In the present embodiment, upon receiving input of information representing the content of a user's operation on the button operation portion 231 or the like of the operation portion 212 via the operation interface 23, the control unit 21 transmits the information to the information processing apparatus 1 via the communication unit 25. In addition, the control unit 21 outputs information output from the sensor included in the sensor unit 24 to the information processing apparatus 1 via the communication unit 25.

The storage unit 22 is a memory device or the like, and holds programs to be executed by the control unit 21. The programs may be ones provided by being stored in a computer-readable non-transitory storage medium and copied to the storage unit 22. The storage unit 22 also operates as a work memory for the control unit 21.

The operation interface 23 outputs information representing the content of the user's operation on the button operation portion 231 or the like provided in the operation portion 212 to the control unit 21. The sensor unit 24 includes at least one sensor including the finger motion sensor 213, and outputs information having been output from the sensor (sensor output) to the control unit 21.

The communication unit 25 is a wired interface such as a universal serial bus (USB) interface or a wireless interface such as Bluetooth (registered trademark), and outputs various information to the information processing apparatus 1 in accordance with instructions input from the control unit 21.

As illustrated in FIG. 1, the information processing apparatus 1 includes a control unit 11, a storage unit 12, an interface unit 13, and an output unit 14. The control unit 11 is a program control device such as a CPU, and operates according to programs stored in the storage unit 12. In the present embodiment, the control unit 11 receives information related to the shape change of the base part of the user's finger from the controller device 20 and estimates the movement of the user's fingers on the basis of the information. The specific processing contents of the control unit 11 will be described in detail later.

The storage unit 12 is a memory device or the like and holds programs to be executed by the control unit 11. The programs may be ones provided by being stored in a computer-readable non-transitory storage medium and copied to the storage unit 12. The storage unit 12 also operates as a work memory for the control unit 11.

The interface unit 13 is connected to the controller device 20 by wireless or wired connection, and receives information representing the content of the user's operation from the controller device 20 and information related to the shape change of the base parts of the user's fingers, and outputs the information to the control unit 11.

The output unit 14 has an interface for outputting video and the like to a home television such as a high-definition multimedia interface (HDMI) (registered trademark) interface. The output unit 14 outputs video information to be displayed in accordance with an instruction input from the control unit 11.

Next, the finger motion sensor 213 of the controller device 20 according to the present embodiment and the operation of the control unit 11 of the information processing apparatus 1 will be described.

The finger motion sensor 213 includes at least one type of sensor such as a pressure sensor, a distance sensor, a strain sensor, and a capacitance sensor, and outputs a sensor output according to the shape change and positions of the base parts of the user's fingers. In other words, in the human hand, when the finger is stretched out (in the state where the finger is stretched straight so that the palm surface and the finger lie in the same plane), the base part of finger on the palm protrudes slightly from this plane (FIG. 4(a)), but as the bending degree of the finger becomes greater, the amount of protrusion on the base part of the finger becomes greater in the bending direction (FIGS. 4(b) and 4(c); the original surface is indicated by a one-dot chain line, and is exaggerated slightly).

Figure 4:
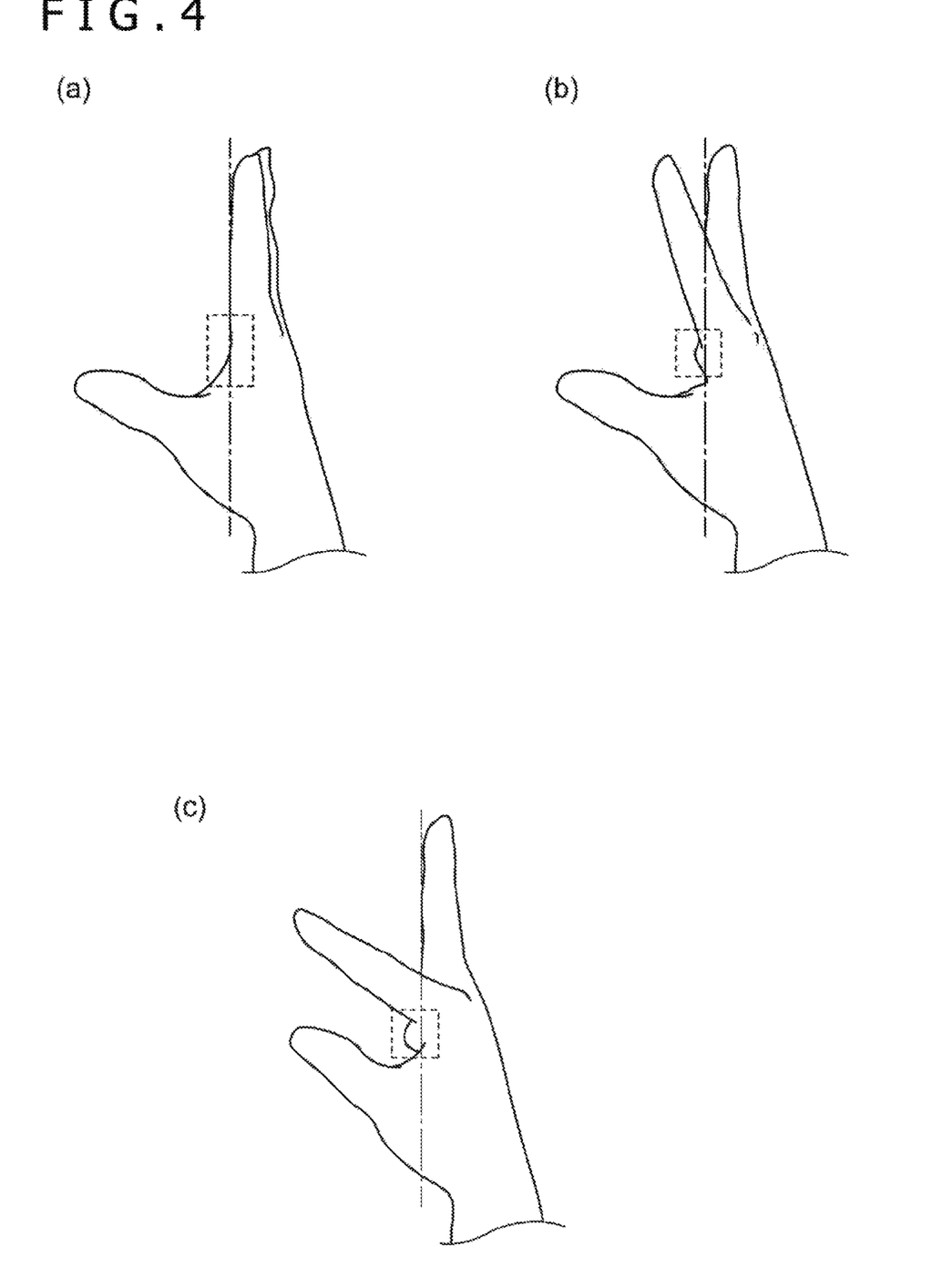
FIG. 4 depicts schematic explanatory diagrams illustrating changes in a shape of a base of a finger detected by the controller device according to the embodiment of the present invention.

The finger motion sensor 213 according to the present embodiment outputs such a sensor output according to the shape change of the base part of the user's finger. Further, the finger motion sensor 213 may also output a sensor output according to the position of the base of the finger.

Figure 5:
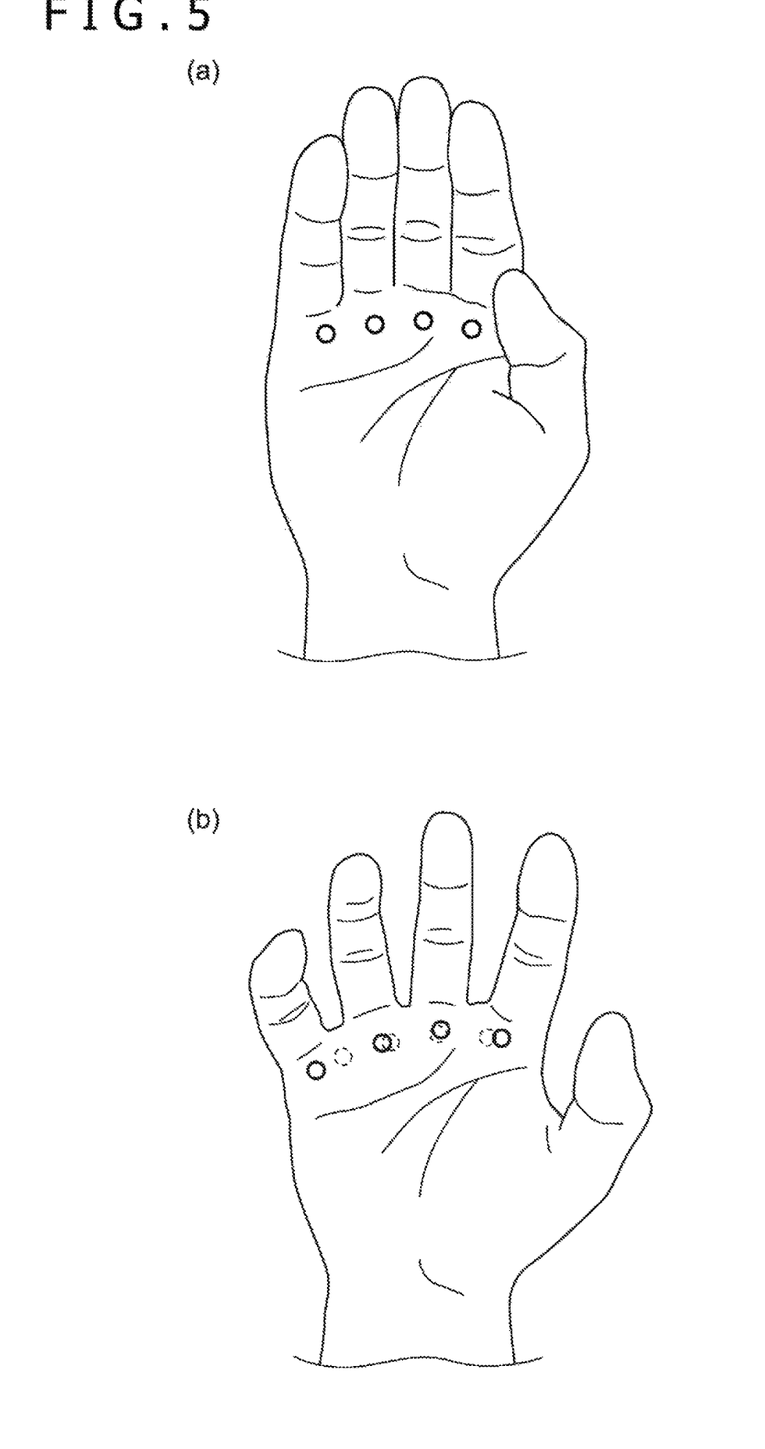
FIG. 5 depicts schematic explanatory diagrams illustrating a change in a position of the bases of fingers detected by the controller device according to the embodiment of the present invention.

That is, regarding a state where the adjacent fingers are in contact with each other (FIG. 5(a)) and a state where the fingers are spread (with the adjacent fingers apart) (FIG. 5(b)) in the width direction of the palm, the area of the base of the finger that protrudes when the finger is bent also changes corresponding to the movement of the finger between the state where the bases of the adjacent fingers are close to each other (FIG. 5(a)) and the state where the bases of the adjacent fingers are relatively apart (FIG. 5(b)). Incidentally, in FIG. 5(b), the position corresponding to the base of each finger in FIG. 5(a) is illustrated by a circle of a broken line. Therefore, a plurality of sensors are arranged according to this width, or a sensor for detecting the position on the base of the finger in this range is arranged.

To be specific, in the case where the finger motion sensor 213 is a pressure sensor, the pressure sensor is positioned so as to come in contact with bases of at least some of the user's fingers when the user grips the device body 210 and so as to output the sensor output according to the pressure in the direction perpendicular to the user's palm.

In this example, the finger motion sensor 213 includes a pressure sensor corresponding to at least each of the user's fingers (each of thumb, index finger, middle finger, third finger, and little finger).

Each pressure sensor outputs a sensor output indicating a relatively small pressure when the user extends the corresponding finger, and outputs a sensor output indicating a larger pressure as the user bends the corresponding finger more greatly. The finger motion sensor 213 outputs sensor output information of the pressure sensor corresponding to each finger to the control unit 21 as information based on the shape change of the base part of the user's finger. Then, the control unit 21 outputs this information to the information processing apparatus 1 via the communication unit 25.

Further, in the case where the finger motion sensor 213 is a distance sensor, the distance sensor is positioned so as to come in contact with bases of at least some of the user's fingers when the user grips the device body 210 and so as to output the sensor output according to the distance to the base of a finger in a direction perpendicular to the user's palm.

In this example, the finger motion sensor 213 includes a distance sensor corresponding to at least each of the user's fingers (each of thumb, index finger, middle finger, third finger, and little finger).

Each distance sensor outputs a sensor output representing a relatively long distance when the user extends the corresponding finger because the base of the finger does not protrude. The distance sensor outputs a sensor output representing a shorter distance as the user bends the corresponding finger more greatly. The finger motion sensor 213 outputs sensor output information of the distance sensor corresponding to each finger to the control unit 21 as information related to the shape change of the base part of the user's finger. Then, the control unit 21 outputs this information to the information processing apparatus 1 via the communication unit 25.

Further, in the case where the finger motion sensor 213 is a strain sensor, the strain sensor is positioned so as to come in contact with the bases of at least some of the user's fingers when the user grips the device body 210, and outputs sensor output according to the strain caused by the pressing force.

In this example, the finger motion sensor 213 includes a strain sensor corresponding to at least each of the user's fingers (each of thumb, index finger, middle finger, third finger, and little finger). Since the base part of finger does not protrude when the user stretches the corresponding finger, each strain sensor is pressed with a relatively small force and outputs a sensor output indicating that only a relatively small strain is detected. In addition, since the strain sensor of this example is pressed with a greater force as the user bends the corresponding finger more greatly, a sensor output representing a greater strain is output as the user bends the corresponding finger more greatly. The finger motion sensor 213 outputs sensor output information of the strain sensor corresponding to each finger to the control unit 21 as information related to the shape change of the base part of the user's finger. Then, the control unit 21 outputs this information to the information processing apparatus 1 via the communication unit 25.

A case where the finger motion sensor 213 is a capacitance sensor will be described. The capacitance sensor is, for example, a touch panel, and outputs a sensor output according to the capacitance at various locations within a surface (detection surface) having a predetermined area. In the case where such a capacitance sensor is used, the capacitance sensor is arranged so as to output a sensor output according to the capacitance in the range of an area with which the base of the user's finger comes in contact when the user grips the device body 210.

Figure 6:
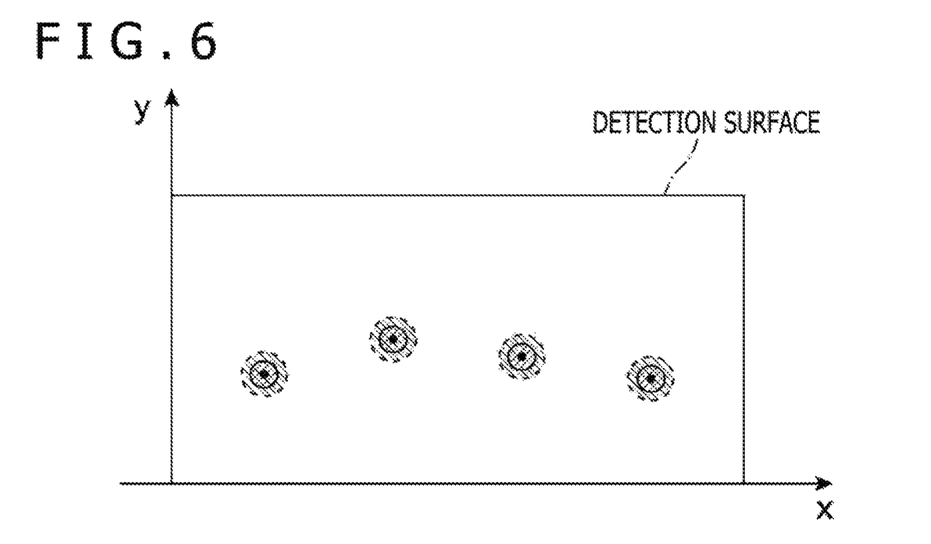
FIG. 6 is an explanatory diagram illustrating a detection example by a capacitance sensor of the controller device according to the embodiment of the present invention.

The capacitance sensor outputs a sensor output indicating that the change in capacitance at the base part of the stretched finger is small when the user stretches the finger, and outputs a sensor output indicating that the change in capacitance at the base part of the bent finger is larger as the user bends the finger more greatly. The sensor output of this capacitance sensor is information representing the amount of change in capacitance at each point on the detection surface of the capacitance sensor, as illustrated in FIG. 6, for example. Incidentally, it is indicated that the color becomes darker as the amount of change becomes larger in FIG. 6.

The finger motion sensor 213 outputs the sensor output information of the capacitance sensor to the control unit 21 as information related to the shape change of the base part of the user's finger. Then, the control unit 21 outputs this information to the information processing apparatus 1 via the communication unit 25.

The capacitance sensors include not only a sensor that outputs sensor outputs according to changes in capacitance at various locations within the detection surface, such as a touch panel, but also a sensor that outputs a sensor output according to changes in capacitance at one location (what is called a proximity switch). In this case, the capacitance sensor is provided corresponding to at least each of the user's fingers (each of the thumb, index finger, middle finger, third finger, and little finger), similarly to the pressure sensor, and outputs information regarding the amount of change in capacitance according to the bending degree of the corresponding finger.

Figure 7:
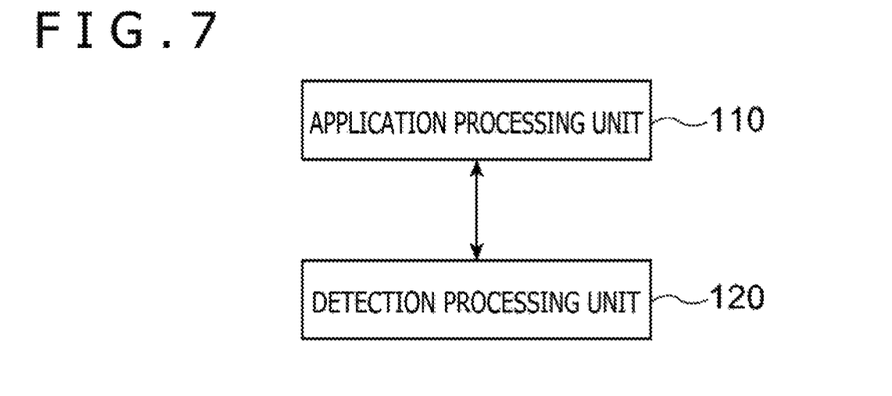
FIG. 7 is a functional block diagram illustrating an example of the information processing apparatus according to the embodiment of the present invention.

The control unit 11 of the information processing apparatus 1 functionally includes an application processing unit 110 and a detection processing unit 120 as illustrated in FIG. 7. The application processing unit 110 executes an application program such as a game application. The application processing unit 110 may instruct the detection processing unit 120 to perform processing in accordance with the application program. Moreover, the application processing unit 110 displays a character controlled by the user in virtual space, for example. At this time, the application processing unit 110 sets the posture and movement of the character in the virtual space on the basis of the information representing the movement of the user's finger output from the detection processing unit 120, and reflects the setting in the display content.

The detection processing unit 120 generates information representing the movement of the user's finger on the basis of the information related to the shape change of the base part of the user's finger received from the controller device 20. For example, the detection processing unit 120 accepts the information in the case where the controller device 20 outputs the sensor output of the pressure sensor, the distance sensor, and the strain sensor (or the proximity switch), as the finger motion sensor 213, for each finger of the user, as information related to the shape change of the base part of the user's finger.

This information includes a plurality of pieces of sensor output information such as sensor output R1 related to the thumb and sensor output R2 related to the index finger. The detection processing unit 120 of the control unit 11 generates and outputs information representing the bending state of each finger as information representing the movement of each finger of the user from the plurality of pieces of sensor output information.

As an example, the detection processing unit 120 of the control unit 11 obtains information Bi indicating the degree of bending of the finger on the basis of the sensor output information Ri related to a certain finger by using the following equation.

$$Bi = \alpha i \times Ri$$

(i=1, 2, . . . 5)
Here, α is a proportionality constant determined experimentally for each finger, and is a positive value in the case of using a pressure sensor or a strain sensor (a positive value for a value that becomes lager as the finger is bent more greatly), and is a negative value in the case of using a distance sensor (or a proximity switch) (a negative value for a value that becomes smaller as the finger is bent more greatly). In addition, the value a may be a value common to each finger.

Further, when the index finger is bent, for example, since the base of the finger of the adjacent middle finger also protrudes slightly from the palm surface actually, information indicating the bending state of each finger may be obtained by $$B = [A]R(1).$$

Here, B is a vector in which pieces of information Bi (i=1, 2, . . . , 5) representing the bending state of each of the thumb, index finger, middle finger, third finger, and little finger are arranged, and R is a vector in which pieces of sensor output information Ri (i=1, 2, . . . 5) of corresponding finger are arranged. Further, [A] is a 5×5 matrix whose elements are determined experimentally. According to this example, for example, the bending degree of the middle finger (representing the element in pth row and qth column of a matrix [A] as apq) is expressed as $$B3 = a31R1 + a32R2 + a33R3 + a34R4 + a35R5$$

and the change a32R2 based on the sensor output related to the index finger adjacent to the middle finger and the change a34R4 based on the sensor output related to the third finger are considered together with the change a33R3 based on the sensor output related to the middle finger.

In an example of the present embodiment, the parameters, αi, the value of each element of [A], and the like to be used for the calculation here may be acquired by learning of machine learning processing. Further, in this case, a configuration may be made so that not only information regarding simple finger bending state but also information regarding finger postures (such as the first joint bending state and the second joint bending state) may be output. That is, the parameters to be used for the calculation are obtained by repeating the feedback of the difference between the response of the above calculation to the measured sensor output and the actual posture so as to adjust parameters to be used for the calculation by assistance of a plurality of sample users who actually create different finger postures in advance. In this example, the detection processing unit 120 of the control unit 11 performs a calculation using the parameters thus learned, and generates and outputs information regarding the posture of each finger on the basis of the sensor output information Ri of each finger.

(Example of Detecting the Degree of Finger Spreading)

Further, as already described, the finger motion sensor 213 according to the present embodiment may detect how much the adjacent fingers are spread (separate adjacent fingers from each other) in the palm width direction. In this example, in the case where a pressure sensor, a distance sensor, or a strain sensor (or a proximity switch) is used as the finger motion sensors 213, a plurality of sensors including the pressure sensors, the distance sensors, or the strain sensors (or the proximity switches) are arranged in the width direction of the user's palm with the number of these sensors exceeding the number of fingers. In addition, the size of the arrangement range is set to be equal to or greater than the width of the palm when the average user spreads the fingers. Furthermore, the arrangement need not be one-dimensional (linear), and may be arranged in a zigzag manner or in a two-dimensional manner in a matrix.

In this case as well, sensor output information from each sensor is output to the control unit 21 as information related to the shape change of the base part of the user's finger. Then, the control unit 21 outputs this information to the information processing apparatus 1 via the communication unit 25.

Figure 8:
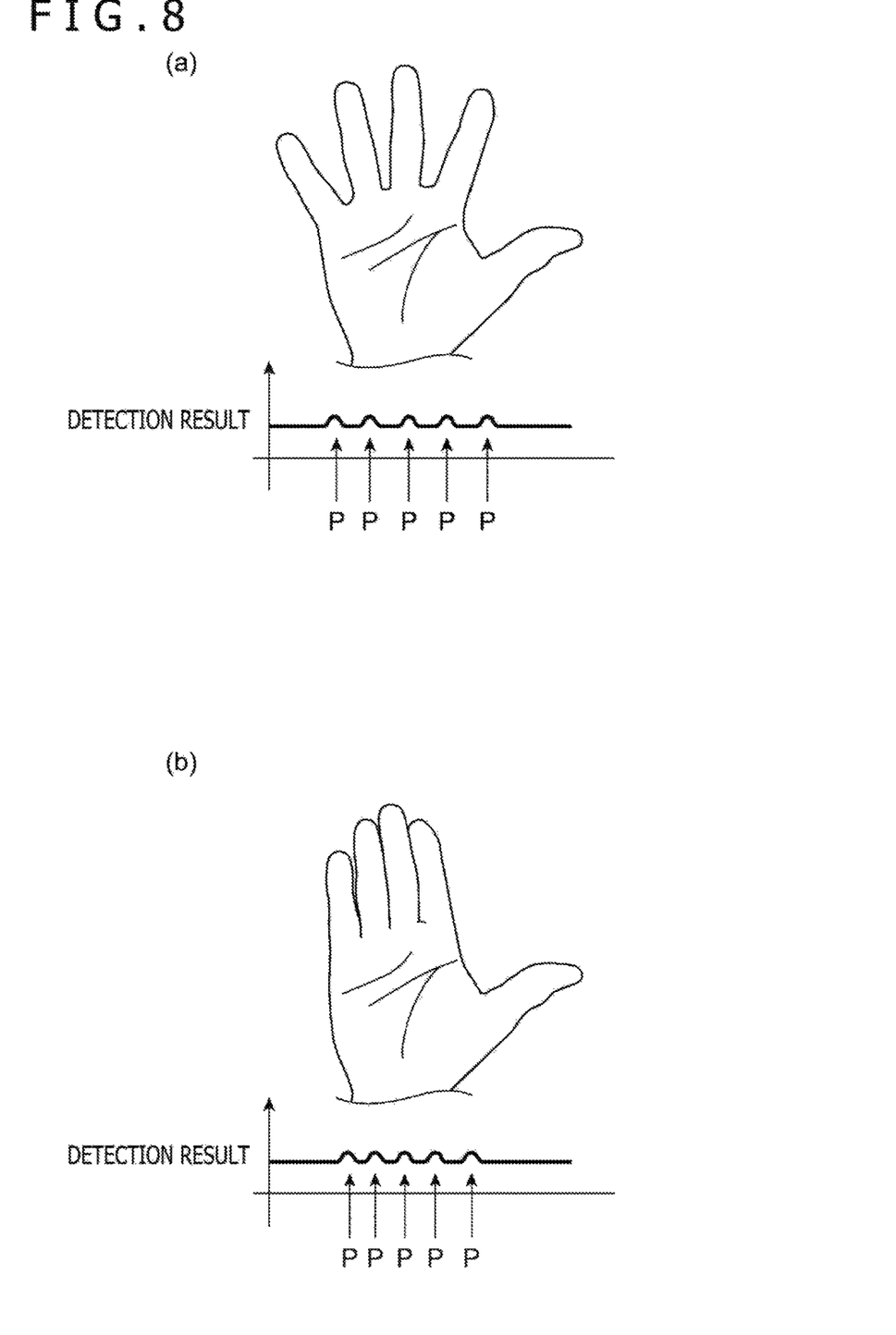
FIG. 8 depicts explanatory diagrams illustrating examples of detection of the positions of the bases of fingers by the controller device according to the embodiment of the present invention.

To be specific, the sensor output information in sensors in this case forms generally a group of sensor outputs having peaks P at a plurality of points in the palm width direction as illustrated in FIG. 8 (even when the fingers are extended, the base parts of the fingers protrude somewhat from the palm relative to the parts corresponding to the forks between the fingers, so that the pressure, distance, and the like peak at the base parts of the fingers). Incidentally, FIG. 8(a) illustrates a state where the fingers are spread, and FIG. 8(b) illustrates a state where the fingers are closed.

Therefore, the control unit 11 of the information processing apparatus 1 that has received such sensor output information detects the position of each peak, and outputs position information indicating that a finger is present at this detected position. Thereby, whether the fingers are in a spread state (adjacent fingers are separated from each other) or fingers are in a closed state (adjacent fingers are brought closer) can be detected.

Incidentally, in this example, in the case where a capacitance sensor that outputs a sensor output corresponding to a change in capacitance at various locations in the detection surface such as a touch panel is used as the finger motion sensor 213, the position information indicating that the finger is at the detected position may be output on the basis of the peak position of the capacitance value.

(Sensor Type)

In the above description, the finger motion sensor 213 includes any one type of a pressure sensor, a distance sensor, a strain sensor, and a capacitance sensor, but the present embodiment is not limited to this and a plurality of types of sensors may be used in combination.

In this case, the detection processing unit 120 of the control unit 11 calculates the bending degree of the user's finger on the basis of the sensor outputs Rai, Rbi, . . . (i=1, 2, . . . , sensor outputs for each sensor type are expressed as Ra, Rb, . . . ) as follows.

$$Bi = \alpha i \times Rai + \beta i \times Rbi + \ldots$$

Alternatively, the detection processing unit 120 calculates the bending degree of the user's finger by using a matrix [A], [B], . . . corresponding to each sensor type as follows.

$$B = [A]Ra + [B]Rb + \ldots$$

Also, in this example, each of parameters α, β, . . . or matrix [A], [B], . . . may be acquired by machine learning processing or the like so that not only the bending state information but also finger posture information can be output.

Further, the sensor may be used in combination with an acceleration sensor, a camera, a myoelectric sensor, or the like. In this case, the pieces of information from these are also used for calculation of information regarding the bending state of the user's finger and the posture of the finger similarly to the manner described above.

(Detection by a Plurality of Sensors)

Figure 9:
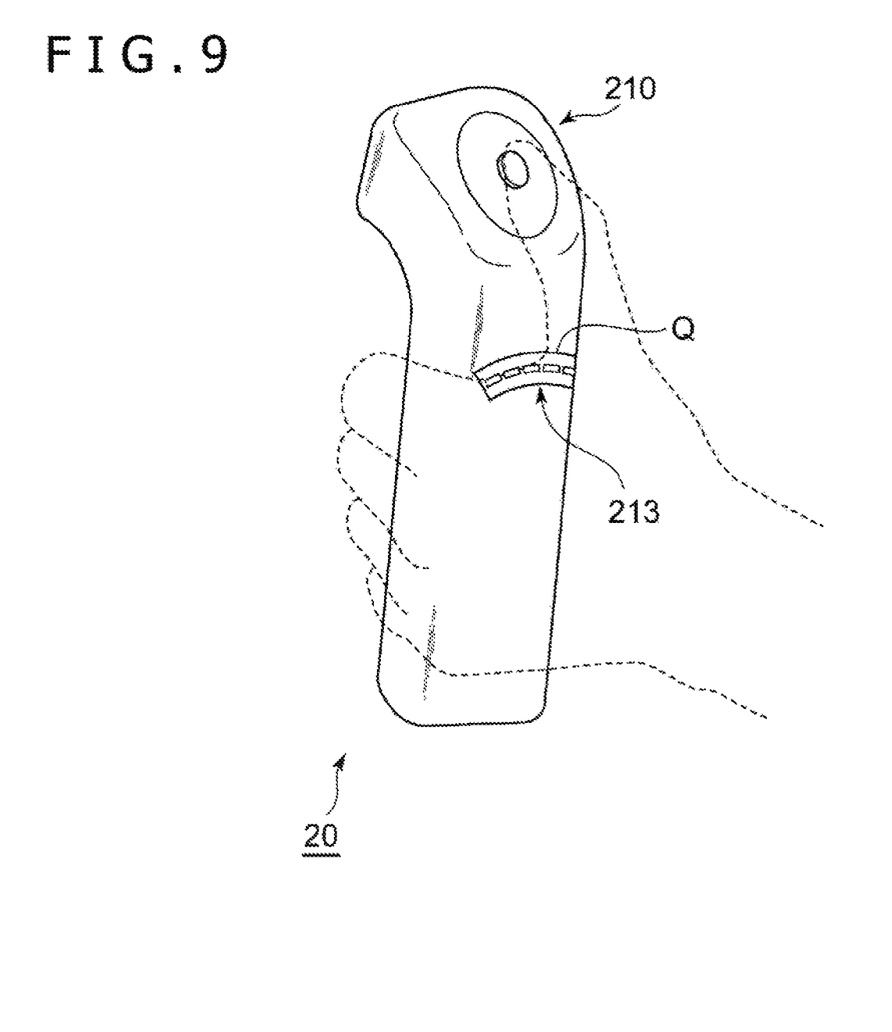
FIG. 9 is an explanatory diagram illustrating an example of an arrangement range of sensors in the controller device according to the embodiment of the present invention.

Further, in the example of the present embodiment, the thumb has a larger range of motion than other fingers, and therefore, even in the case where a sensor is provided for each finger, a plurality of sensors may be associated with the thumb. As an example, when a user grips the device body 210, a plurality of sensors for the thumb (pressure sensors, distance sensors, strain sensors, etc.) may be arranged in an arcuate range Q with which the base of the thumb can come in contact, as schematically illustrated in FIG. 9.

In this example, the detection processing unit 120 of the control unit 11 may use the sensor outputs R11, R12, ... R1$i$ of respective sensors corresponding to the thumb to calculate the value of the thumb bending degree by using B1=α11×R11+α12×R12+ . . . , for example. Also, in this case, the information processing apparatus 1 may cause parameters (α11, α12, . . . ) to be learned by machine learning using known bending state and posture of the thumb and sensor output as teacher signals to estimate the bending state and posture of the thumb using the parameters obtained by the learning.

As described above, in the case where a plurality of sensors that are k types of sensors are used and nκ=1, 2, ... k; nκ is an integer of 1 or more) sensors are used for each type, a matrix a related to the parameters may be set to be an N×5 matrix (N=Σ_κ (nκ)) in accordance with the equation (1), and the coefficient corresponding to the sensor output of each sensor according to the movement of each finger may be reflected. In this case, the sensor outputs are arranged so that R in equation (1) is a vector of 1 row and N columns. In such a way, B in equation (1) becomes a vector of 5 rows and 1 column, and the interpretation of the output is similar to in the examples described so far.

(Calibration for Each User)

In an example of the present embodiment, calibration for each user may be executed on parameters to be used for calculation. For example, the information processing apparatus 1 requests the user to grasp the controller device 20 with the fingers bent, and obtains the sensor output of each sensor when the user takes this posture (sensor output when the user bends the fingers during calibration). Further, the user is requested to extend the fingers, and the sensor output of each sensor when the user takes this posture (sensor output when the user extends the fingers during calibration) is acquired. As a result, the detection value range of each sensor is identified, and the parameters (αi, the value of each element of [A], etc.) at the time of calculation are corrected so that detection can be performed according to this detection value range. Further, in this case, the information processing apparatus 1 may perform calculation processing such as bending state of the finger, after subtracting, from the value of the sensor output, the sensor output value when the user stretched the fingers during calibration.

In addition, the information processing apparatus 1 continuously monitors the sensor output of each sensor without explicitly requesting the user to bend and stretch the fingers, and may record a maximum value and a minimum value of the sensor output to update the values, so as to obtain the maximum value and the minimum value of the sensor output while allowing use of the sensor, and to execute the calibration.

(Correction of Determination Results)

Furthermore, the information processing apparatus 1 according to the present embodiment determines whether or not the finger pose is one generally not taken by the user, as a result of calculation of the bending state and posture of each finger in the processing of the detection processing unit 120, and in the case where it is determined that the finger pose is one generally not taken by the user, information indicating that the pose is a predetermined pose (for example, a pose with the fingers naturally spread) may be output.

To be specific, information indicating that all the fingers are extended may be output when it is determined that the third finger is bent greatly and the other fingers are extended, as a result of calculation of the bending state and posture of each finger in the processing of the detection processing unit 120 though it is generally difficult to take an unnatural posture in which only the third finger is bent.

Further, the information processing apparatus 1 records the frequency of this determination (the number of times when it is determined that the finger pose is generally not taken, per unit time), and in the case where this frequency exceeds a predetermined threshold value, that is, in the case where it is determined five times or more in one hour that the finger pose is generally not taken by the user, for example, the information processing apparatus 1 may present information indicating error occurrence to the user, considering that there is an error in the sensor.

(Filtering)

In the present embodiment, the information related to the shape change of the base part of the user's finger output from the finger motion sensor 213 may be used for calculation after a predetermined filtering process instead of being used as it is. As this filtering process, for example, there is a moving average process using an arithmetic average of sensor outputs of the most recent predetermined number of times.

(Gesture Estimation)

The information processing apparatus 1 may further estimate the pose (gesture) of the user's hand from information regarding the bending state of each finger of the user or information regarding the posture obtained by the above calculation.

Further, in this case, the information processing apparatus 1 may output information indicating that the hand pose is different from that obtained by the calculation when the gesture is a predetermined one. For example, in the case where the index and middle fingers are stretched and the others are bent (what is called V-sign), this finger shape may be regarded as an inappropriate gesture in a specific country. Therefore, when determining that the gesture is inappropriate by referring to the setting information of the country or region where the information processing apparatus 1 is being used and/or information such as the user's age setting, the information processing apparatus 1 may change information regarding the degree of bending and stretching of the fingers and information regarding the posture of the fingers so that the different gesture is regarded as being taken.

Effects of the Embodiment

According to the present embodiment, the degree of finger bending and stretching is estimated on the basis of the information regarding the shape change of the base of the finger linked to finger bending and stretching, instead of directly detecting information regarding finger bending and stretching as fingertip movement. Here, the shape of the base of the finger is easy to measure while the sensor is in contact with the base of the finger, and there is no situation where the shape cannot be detected due to the shade of another finger, and thus the movement of the user's fingertip can be detected stably.

REFERENCE SIGNS LIST

1 Information processing apparatus, 11 Control unit, 12 Storage unit, 13 Interface unit, 14 Output unit, 20 Controller device, 21 Control unit, 22 Storage unit, 23 Operation interface, 24 Sensor unit, 25 Communication unit, 110 Application processing unit, 120 Detection processing unit, 210 Device body, 211 Grip portion, 212 Operation portion, 213 Finger motion sensor, 220 Fixing part.

The invention claimed is:

1. An information processing system comprising:
an information processing apparatus; and
a controller device to be worn on a hand of a user, wherein the controller device includes
a device body to be gripped by the user,
a sensor that is arranged at a position on the device body so as to come in contact with a base of at least some of fingers of the user when the user grips the device body and that outputs a sensor output based on a shape change of a base part of a finger of the user, and
a communicator configured to receive the sensor output according to the shape change of the base part of the finger of the user output by the sensor, and sending the sensor output to the information processing apparatus connected to the communicator; wherein
a degree of bending of each finger is obtained by modifying the sensor output related to the respective finger using a proportionality constant that is determined experimentally for the respective finger using machine learning.

2. A controller device that is connected to an information processing apparatus and that is to be worn on a hand of a user, the controller device comprising:
a device body to be gripped by the user;
a sensor that is arranged at a position on the device body so as to come in contact with a base of at least some of fingers of the user when the user grips the device body and that outputs a sensor output based on a shape change of a base part of a finger of the user; and
a communicator configured to receive the sensor output according to the shape change of the base part of a finger of the user output by the sensor, and sending the sensor output to the connected information processing apparatus; wherein
a degree of bending of each finger is obtained by modifying the sensor output related to the respective finger using a proportionality constant that is determined experimentally for the respective finger using machine learning.

3. The controller device according to claim 2, wherein the sensor includes at least one type of sensor that is one of a pressure sensor, a distance sensor, a strain sensor, and a capacitance sensor.

4. The controller device according to claim 2, wherein
the sensor includes a plurality of sensors that are arranged in a width direction of a palm of the user and that are one type of sensors including at least one of a pressure sensor, a distance sensor, and a strain sensor, and
the communicator receives the sensor output of each of the arranged plurality of sensors as information related to the shape change of the base part of the finger of the user and sends the sensor output to the connected information processing apparatus.

5. An information processing apparatus connected to a controller device, the controller device including
a device body to be gripped by a user, and
a plurality of sensors that are arranged in a width direction of a palm of the user on the device body so as to come in contact with a base of at least some of fingers of the user when the user grips the device body and that are one type of sensors including at least one of a pressure sensor, a distance sensor, and a strain sensor, so as to output a sensor output based on a shape change of a base part of a finger of the user,
the information processing apparatus comprising:
a communicator configured to receive the sensor output of each of the arranged plurality of sensors from the controller device, as a sensor output according to the shape change of the base part of the finger of the user; and
a processor configured to perform a process of estimating a movement of the finger of the user in the width direction of the palm on a basis of the received information; wherein
a degree of bending of each finger is obtained by modifying the sensor output related to the respective finger using a proportionality constant that is determined experimentally for the respective finger using machine learning.

* * * * *